April 19, 1932.　　　　G. D. BARKER　　　　1,854,289
HEATER CONTROL
Original Filed June 15, 1929　　3 Sheets-Sheet 1

Inventor
Galen D. Barker

By
Bottum, Hudnall, Lecher, McNenny and Michael
Attorney.

April 19, 1932.  G. D. BARKER  1,854,289
HEATER CONTROL
Original Filed June 15, 1929  3 Sheets-Sheet 2
FIG.2
FIG.3
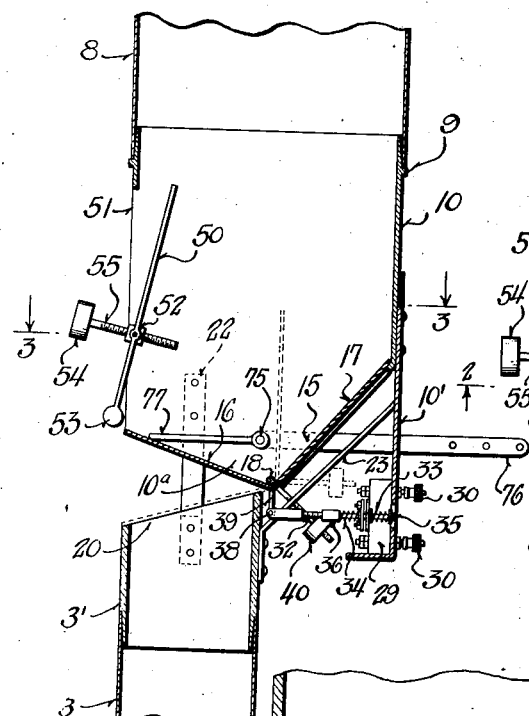
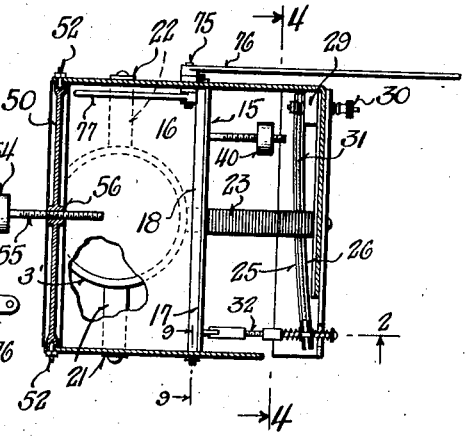
FIG.4
FIG.5
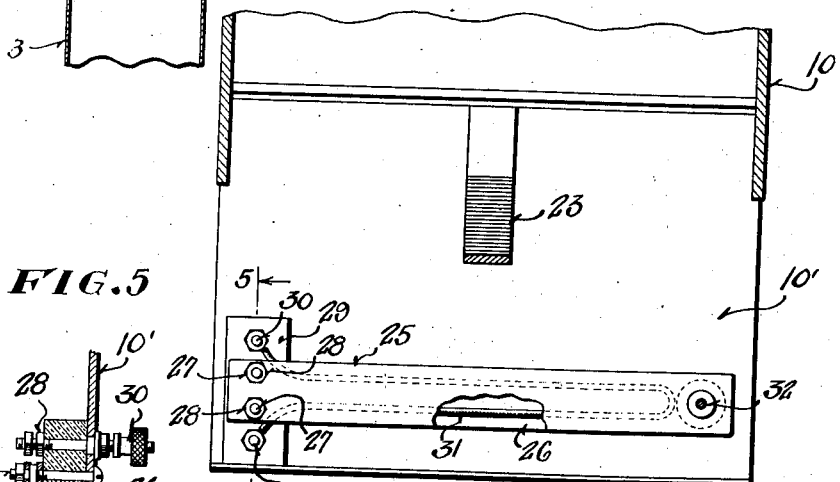
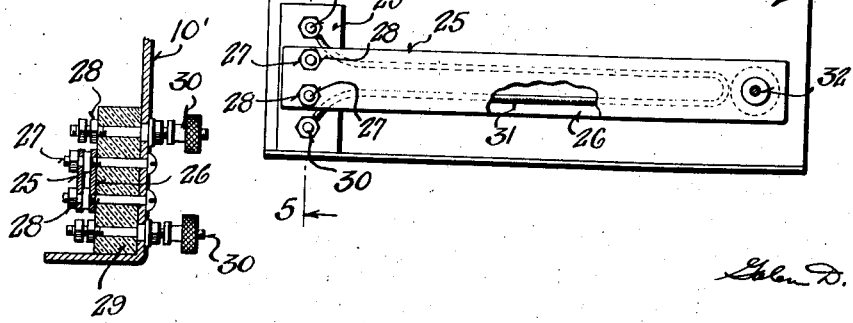
Inventor
Glen D. Barker

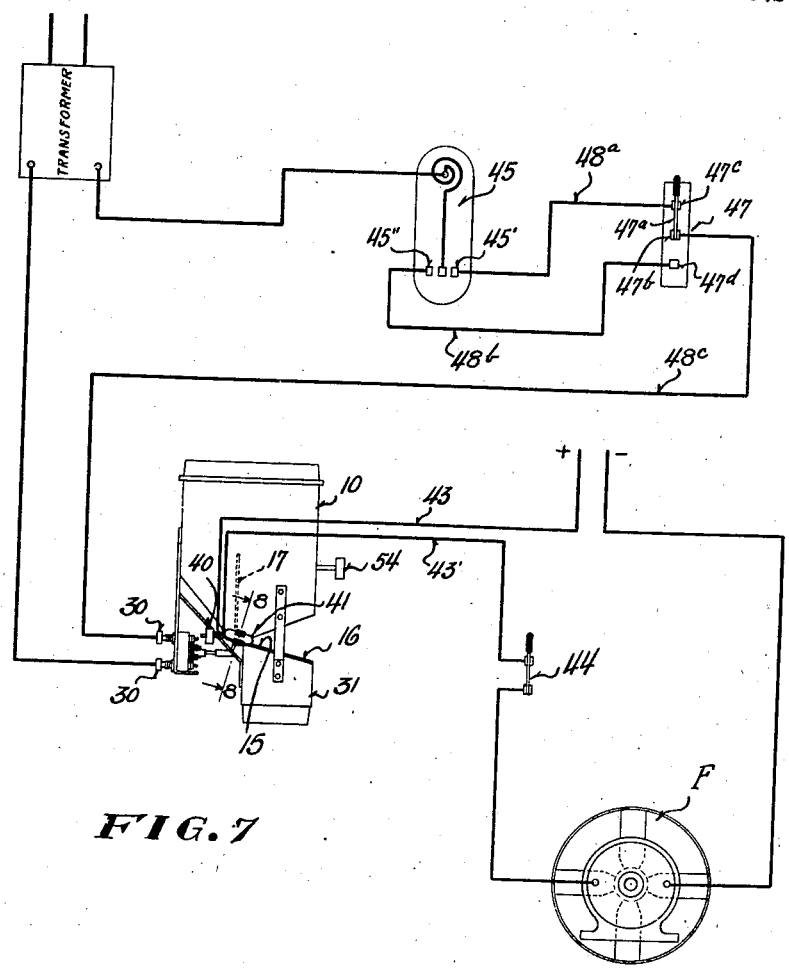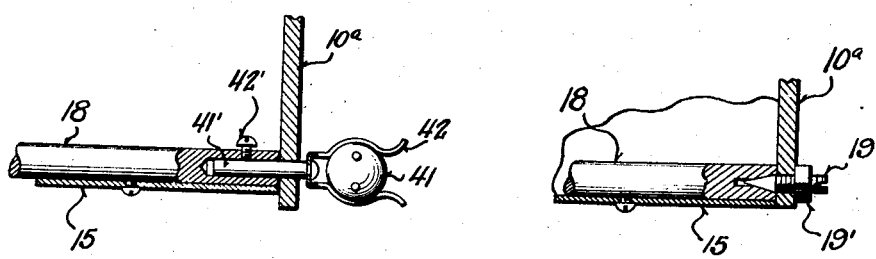

Patented Apr. 19, 1932

1,854,289

UNITED STATES PATENT OFFICE

GALEN D. BARKER, OF DOWAGIAC, MICHIGAN

HEATER CONTROL

Application filed June 15, 1929, Serial No. 371,076. Renewed December 31, 1931.

This invention relates in general to means for controlling the combustion in a heater, such as a furnace or boiler, and more particularly to an automatic draft regulating mechanism for a heater adapted to be controlled primarily by a thermostat and to some extent also by an auxiliary draft responsive check damper.

One of the principal objects of the present invention is to provide a heater control of this character which exerts a positive regulation over the direct draft and check draft of the heater whereby to sustain combustion at the rate that is necessary or desirable under the prevailing conditions. Moreover, the invention proposes an auxiliary or emergency control in the form of an automatic draft responsive check damper which operates when combustion has been so accelerated as to generate heat faster than it can be absorbed with safety and economy in the heating system and which effects, under such circumstances, a material reduction in the amount of air pulled through the fire and also cooling of the gases in the stack thereby retarding combustion to a point consistent with safety and economy.

A further object of the invention is the adaptation of an air circulating system to the heating of the premises in the winter and the cooling and ventilating of the same in the summer; a thermostat controlling the operation of the fan in winter to start the same when the temperature falls below a predetermined minimum and to stop the same when the temperature rises above a predetermined maximum, and the action of the thermostat being reversed in summer whereby the fan is operated at high temperatures and stopped at low temperatures. Thus, dependent upon seasonal and atmospheric needs, air, which may be heated, cooled or otherwise conditioned, is circulated through the system as may be required for health and comfort.

Another object resides in the provision of a control having these advantages and capacities and which is simple and durable in construction, reliable and efficient in operation and easy and comparatively inexpensive to manufacture and install.

In carrying out the present invention the heater is equipped with a pipe or conduit connected to the ash pit and a similar pipe or conduit connected to the stack and the ends of these pipes are positioned adjacent each other and are controlled by a single damper cooperable with the direct draft pipe to permit or shut off the direct draft and also cooperable with the stack pipe to cut off or permit a check draft in the stack. This single dual purpose damper may be operated in any suitable way but in the embodiment illustrated it is actuated in a novel manner by a suitable motor whose action is controlled by a thermostatic switch such as a room thermostat, temperature limiting switch or the like. The motor may be of any suitable type, but preferably consists of a bi-metallic element having one end anchored and its other end operatively connected to the damper. An electric heating element is operatively associated with the bi-metallic element and is supplied with heating current under the control of the room thermostat, thermostatic limiting switch or the like.

In the stack pipe an automatic draft responsive damper is incorporated. This auxiliary damper is freely and eccentrically mounted so that the draft tends to open the same. The static balance of the auxiliary damper disturbed by its eccentric mounting is restored by suitably distributed weight and the damper is biased to closed position by an adjustable overbalancing or biasing weight. With such a damper, when the draft through the stack exceeds the point of safety and efficiency, the force of the draft overcomes the biasing action of the weight and the auxiliary check draft damper is opened to retard the combustion to the desirable extent.

Where desired, the control mechanism described may be organized with a control for auxiliary equipment for example, the main control mechanism may be utilized to regulate the action of the heater in winter and to control the action of a furnace fan in summer for purposes of ventilation.

Other objects and advantages reside in certain novel features of the construction, arrangement and combination of parts which will be hereinafter more fully described and particularly pointed out in the appended claims, reference being had to the accompanying drawings forming a part of this specification, and in which:

Figure 2 is a fragmentary sectional view taken on line 2—2 of Figure 3 and showing the damper mechanism for the direct draft and check draft and the operating mechanism therefor;

Figure 3 is a view in horizontal section taken on line 3—3 of Figure 2, but showing a different position of the damper;

Figure 4 is a view in section taken on line 4—4 of Figure 3;

Figure 5 is a sectional view taken on line 5—5 of Figure 4;

Figure 7 is a diagrammatic view showing the heater control organized with an auxiliary control means for a furnace fan;

Figure 8 is a fragmentary detail sectional view taken on line 8—8 of Figure 7; and Figure 9 is a similar view on line 9—9 of Figure 3.

Figure 1:
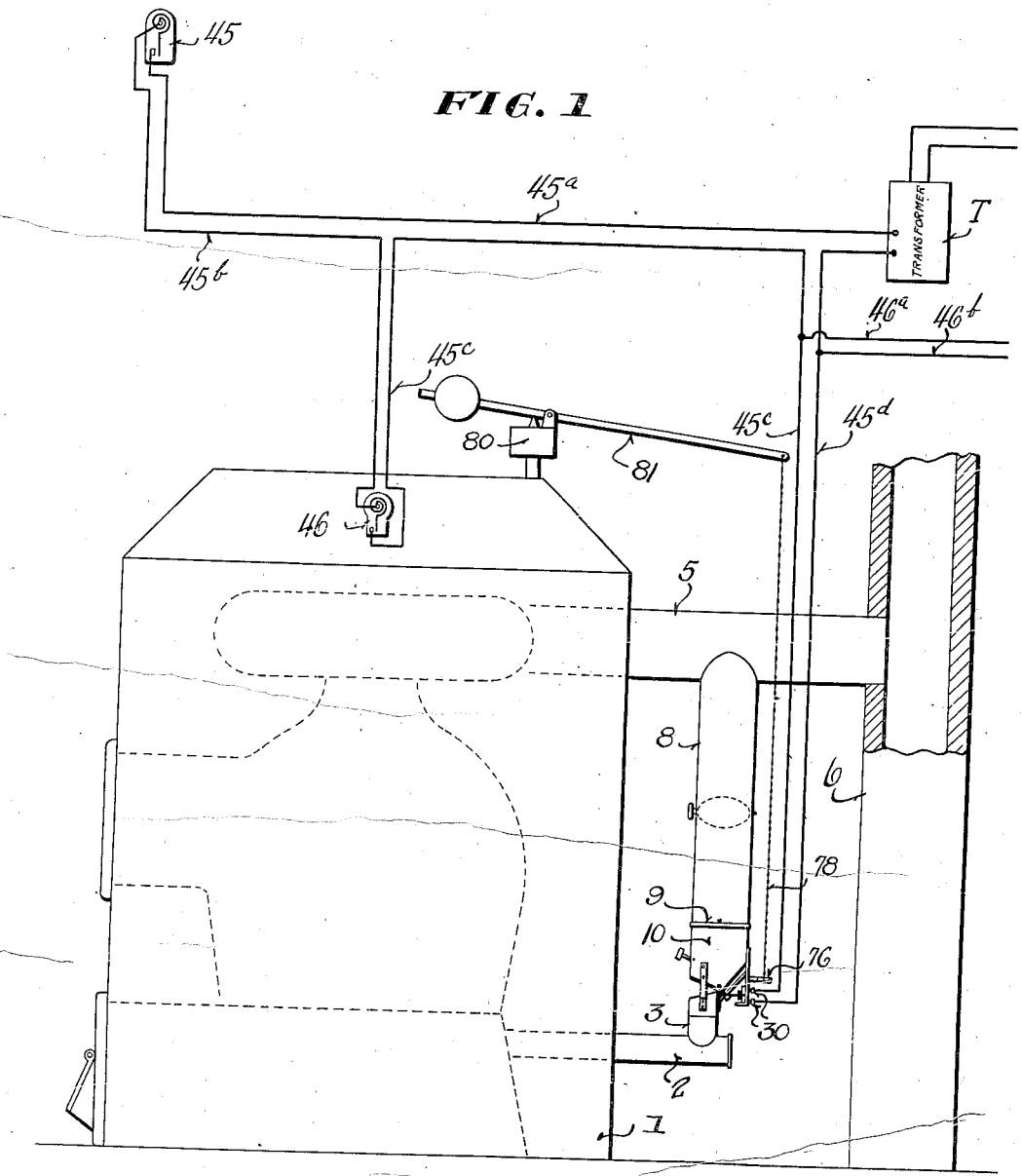
Figure 1 is a view partly in side elevation and partly in section showing a heater equipped with a control embodying the present invention.

Referring to the drawings, more particularly to Figure 1, the numeral 1 designates the heater which is shown diagrammatically and although usually a furnace or boiler may be of any suitable type or construction.

The direct draft to the furnace is had through a direct draft pipe 2, the inner end of which opens into the ash pit and the outer end of which is closed. Adjacent its outer end the pipe 2 is provided with a vertical section 3 which freely communicates with the interior of the main section of the pipe 2 and has its upper end open and communicating with the atmosphere when permitted to do so by the damper mechanism.

A flue or stack pipe 5 communicates with the combustion space of the furnace or boiler and leads to a chimney 6 and has a vertically extending stack pipe section 8 freely communicating with an intermediate portion thereof and extending downwardly therefrom, the pipe section 8 being connected at its lower end to an annular flange 9 formed on the upper end of a damper casing designated generally at 10. The damper casing 10 is of rectangular form in cross section but its side walls are formed with tapered or pointed extensions 10ª which project downwardly beyond the lower edges of the end walls of the casing. The lower end of the damper casing 10 is open, but the opening thereof is controlled by the damper mechanism now to be described.

As shown to advantage in Figures 2 and 3 the damper mechanism comprises a substantially V-shaped damper 15 fixed at the intersection of its angularly disposed sections 16 and 17 to a supporting shaft 18, the ends of which are formed with tapered sockets receiving the tapered inner ends of trunnions 19 threaded through the lower pointed ends of the opposite walls of the damper casing 10 and held in position by lock nuts 19'. The angular formation of the damper 15 corresponds to the tapered formation of the extensions 10ª of the side walls of the damper casing and in the position shown in full lines in Figure 2 the damper 15 completely blocks or closes the lower end of the casing 10 and thus shuts off the check draft. The direct draft is, however, open at this time. When the damper 15 is rocked to the dotted line position shown in Figure 2 or the full line position shown in Figure 3, the section 16 thereof fits flush against the angled end 20 of the end fitting or flange 3' of the direct draft pipe 3 to close the direct draft pipe and shut off the direct draft.

By having the end of the direct draft pipe cut off at an appropriate angle when the damper 15 is in the dotted line position shown in Figure 2, its section 17 is vertically disposed and presents a minimum obstruction in the opening through the casing 10 thereby providing for a maximum check draft when the direct draft is shut off. The damper casing 10 and direct draft pipe section 3 are held in proper position relative to each other by straps 21, 22 and 23 fastened to the casing 10 and to the end fitting 31.

Figure 6:
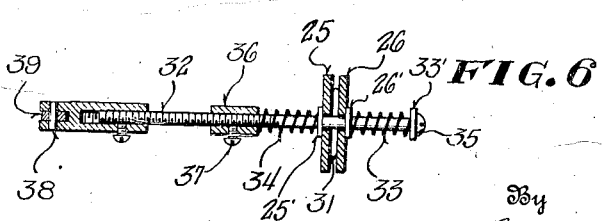
Figure 6 is a detail view on an enlarged scale showing the construction of the yieldable connection between the bi-metallic element and the adjustable connecting link.

The damper 15 is moved or operated by a motor controlled in any suitable manner, as by a room thermostat or other thermostatic switches or safety devices. While the motor may be of any suitable type it is preferably constructed as shown in the drawings and comprises a pair of strips 25 and 26 of bi-metallic metal, the metals of each of the strips 25 and 26 having different co-efficients of expansion. At one end the strips are securely fastened by screws 27 and nuts 28 to an insulating block 29 (see Figures 5 and 6) secured by binding posts 30 and also by the screws 27 and nuts 28 to a bracket 10' fastened to and projecting below the casing 10. It is to be noted that certain of the nuts 28 space the strips 25 and 26 slightly with respect to each other and in the intervening space an insulated electric heating element 31 is disposed, the terminals of the heating element 31 being connected to the binding posts 30. At the end of the strips 25 and 26 opposite that secured to the insulating block 29 they are yieldably connected to an adjustable link 32, the link having a turnbuckle construction so that its length may be varied (see Figure 6). To effect the yieldable connection between the bi-metallic strip assembly and the link 32 the link is extended loosely through apertures in the strips 25 and 26 and a spring 33 is interposed between a washer 33' abutting a head 35 provided on the link 32 and a washer 26' abutting the strip 26 and a second spring 34 is interposed between a washer 25' abutting the other strip 25 and a collar 36 threaded on the link 32 and secured in adjustable position by a set screw 37. The link 32 is pivotally connected as at 38 to a crank arm 39 fixed to the shaft 18 to which the damper 15 is also fixed. The damper 15 is statically balanced by means of an adjustable weight 40.

The supply of current to the heating element 31 is controlled by a room thermostat 45 and also if desired, by a limit switch 46. These switches are a well known construction and require no detailed disclosure.

In the copending applications of Roy W. Johnson for thermostatic switches and thermostatic switches for use with heaters, Serial Numbers 356,581 and 356,580, there is disclosed the details of the switch constructions used as the room thermostat 45 and the limit switch 46. For the purposes of the present invention it is sufficient to understand that one terminal of the transformer T is connected with one of the contacts of the switch 45 by a conductor 45ª, the other contact of the switch 45 being connected by a conductor 45ᵇ with the movable blade of the thermostatic switch 46 and the other contactor of this switch 46 is connected by a conductor 45ᶜ with one of the binding posts 30. The other binding post 30 is connected by a conductor 45ᵈ with the other terminal of the transformer. In other words, the switches 45 and 46 are connected in series in the circuit embodying the heating element 31 of the thermo electric motor. With a control circuit of this character, when the room temperature drops below the selected point and the temperature of the heating medium is at or below a point that it can operate with safety and economy in the system the circuit through the heating element 31 will be completed and it will give off heat to the strips 25 and 26 thereby causing the strips 25 and 26 to flex to the position shown in Figure 2. Such flexion of the strips acts through the link 32 and crank arm 39 to move the damper 15 to the position shown in Figure 2 whereupon the stack pipe 8 is closed and the direct draft pipe 2 is opened. This accelerates the combustion in the furnace and eventually the room temperature rises to the desired point whereupon the thermostat breaks the circuit through the heating element 31 so that the strips 25 and 26 cool off and flex to the position shown in Figure 3. When the strips 25 and 26 move to the position shown in Figure 3 they act through link 32 and crank arm 39 to cause the damper 15 to be positioned to shut off the direct draft and open the check draft thereby retarding combustion. The control circuit, including the control switches 45 and 46, may be employed for controlling the operation of the auxiliary equipment such as a furnace fan, oil burner, coal blower, refrigerating or humidifying unit, motor circulating pump or the like by connecting the electric motors of such auxiliary equipment or relays controlling the operation of such motors across the conductors 45ᶜ and 45ᵈ. Thus in Figure 1, wires 46ª and 46ᵇ are shown connected to the wires 45ᶜ and 45ᵈ respectively and these wires 46ª and 46ᵇ are appropriately connected to a controlling relay or to an electric motor or other electrical mechanism.

However, where a furnace fan F is employed it is preferable to utilize the control system shown in Figure 7 wherein a mercury switch 41 is mounted in a clip 42 secured to and rockable with the damper 15. The clip 42 may be constrained to tilt with the damper 15 in any suitable way. As shown in Figure 8, the mounting of the shaft 18 may be varied to adapt it to carry the switch clip 41. Thus, a smooth cylindrical pivot pin 41' is substituted for the trunnion 19 and is held in a correspondingly sloped socket in the end of shaft 18 by a set screw 42', the outer end of the pin 41' projecting beyond the casing and being suitably secured to the clip 42. The electrodes of this switch 41 are connected to wires 43 and 43' embodied in the motor circuit of the furnace fan, the wire 43 connecting one of the electrodes of the switch with one side of the sources of current and the wire 43' connecting the other electrode with one of the motor terminals. The other motor terminal connects through a wire 44' with the other side of the source of current. A manually operable switch 44 may be incorporated in the wire 43' if desired. In the open position of the damper 15 the mercury switch 41 is rocked to complete the control circuit for the motor of the furnace fan whereas in the closed position of the damper 15 the switch 41 breaks the circuit of the motor for the blower fan.

Of course, during the winter months it is desirable to cause the damper 15 to rock to its open position, that is, to the position where it opens the direct draft and closes the check draft upon a drop in the room temperature and to effect reverse positioning of the damper 15 upon an appropriate rise in room temperature. For the summer time the system should be reversely operated, that is, when the room temperature rises the damper 15 should be opened as this will position the mercury switch 41 to cause the fan to operate whereas when the room temperature drops the damper 15 should be closed to position the switch 41 to cause the fan to be stopped. In order to adapt the control circuit of Figure 1 to this variable operation the room thermostat 45 may consist of the conventional 3-wire thermostat and is connected to the heating element 31 of the thermo electric motor through a single pole double throw master switch 47 (Figure 7). When the blade 47$^a$ of the switch 47 connects the contacts 47$^b$ and 47$^c$ the control circuit is set for furnace fan operation whereas when the blade connects the contacts 47$^a$ and 47$^d$ the circuit is set for heater operation. As shown in Figure 7 the contact 47$^c$ connects through a wire 48$^a$ with the contact 45' of the thermostatic switch 45, the contact 47$^d$ connects by a wire 48$^b$ with the contact 45'' of the thermostatic switch 45 and the contact 47$^b$ connects by a wire 48$^c$ with one of the binding posts 30. The other binding post 30 connects as before with a terminal of the transformer.

With the master switch 47 positioned as shown in Figure 7, the control system is set for summer operation at which time the heater is, of course, not in use but it is desirable to have the furnace fan F operate to circulate air through the heating system and consequently into the building in which it is incorporated. When the room temperature rises the blade of the thermostatic switch 45 engages the contact 45'. This completes the circuit through the heating element of the thermo electric motor and causes the damper 15 to rock from the position shown to a position in which the check draft is closed and the direct draft open. This does not, of course, have any effect on the heater since the heater is not in operation, but this movement of the damper rocks the shaft 18 and the trunnion 41' and consequently tilts the mercury switch so as to complete the fan motor circuit. The fan then operates until the room temperature drops whereupon the circuit through the heating element of the thermo electric motor is interrupted and the damper swings back into the position shown in Figure 7 and consequently the motor circuit for the furnace fan is broken. In the winter the switch 47 is positioned so that its blade connects contacts 47$^b$ and 47$^d$. This is necessary so that a fall in the room temperature will complete the circuit through the thermo-electric motor and a rise in room temperature will break this circuit.

In addition to the damper 15 an automatic draft responsive emergency or auxiliary damper designated generally at 50 may be provided. The damper 50 controls the flow of air into the stack pipe 8 through an opening 51 formed in one of the walls of the casing 10 and is eccentrically mounted on the casing by means of trunnions 52. The eccentric mounting of the damper 50 disturbs its static balance but its static balance is restored by a symmetrically distributed weight 53 on the lower portion of the damper. For the purpose of biasing the damper 50 to closed position an adjustable overbalancing or biasing weight 54 is provided and is carried at the outer end of a screw 55 engaged with a threaded bearing 56 in the damper 50. The threaded bearings 56 is so located at the axis of swing of the damper 50 and its axis intersects the axis of swing and extends at right angles to the plane of the damper. By adjusting the weight 54 the point at which the damper 50 swings open in response to increased draft may be accordingly determined.

Thus, if the damper 15 has been moved to the position shown in Figure 2 and for any reason the room temperature does not rise to the desired point notwithstanding the combustion has been accelerated to such an extent that the heat generated cannot be absorbed with safety and economy in the heating system then the abnormal draft through the stack pipe 5 will pull the damper 50 open against the action of its biasing weight 54. When the damper 50 is open a check draft is had which reduces the amount of air pulled through the fire and retards combustion to the proper degree.

Where the boiler or furnace is provided with a conventional regulator, such as a diaphragm regulator, for the direct draft damper, especially a regulator being designated diagrammatically in Figures 1 and 2, the diaphragm regulator may be employed as an additional safety device or combustion limiting device by connecting its lever 81 to the upper end of a chain 78, the lower end of the chain 78 being connected to a lever 76 fixed to a short shaft 75 journaled in a bearing provided therefor in one of the side walls of the casing 10 and provided with an arm 77 engageable with the section 16 of the dampers 15. When the temperature of the heating medium has been raised to the maximum point at which it can operate with safety and efficiency in the system the regulator will swing the lever 81 to cause it to pull upwardly on the lever 76 and force the section 16 of the damper 15 downwardly against the open end of the direct draft pipe and the section 17 of this damper 15 upwardly to open the check draft. This action is independent of the action of the motor controlled by the room thermostat. It is to be understood, however, that the employment of this diaphragm regulator and the parts controlled thereby is entirely optional. Wherever the limit switch 46 is employed it is unlikely that the diaphragm regulator will be employed.

What I claim is:

1. A control for heaters comprising means affording a direct draft and a check draft, a single damper adapted to permit the check draft and shut off the direct draft in one position and to shut off the check draft and permit the direct draft in another position, a thermo-electric motor controlling the position of said damper and comprising bimetallic strips, means for anchoring the strips at one end, means for connecting the strips at their other end to the damper, an electric heating element interposed between the strips and thermostatic switch controlled means regulating the supply of current to the heating element.

2. A control for heaters comprising a damper operable to regulate the draft through the heater and a thermo-electric motor connected to the damper for operating the same and comprising metal strips having different coefficients of expansion, means for anchoring strips at one end, means for connecting the strips at their other end to the damper, an electric heating element interposed between the strips and thermostatic switch controlled means regulating the supply of current to the heating element.

3. A control for heaters and auxiliary equipment such as a furnace fan comprising means affording a direct draft and a check draft through the heater, a single rockably supported damper adapted to permit the check draft and shut off the direct draft in one position and to shut off the check draft and permit the direct draft in another position, a motor connected to the damper for operating the same, thermostatic switch controlled means for regulating the operation of the motor, a circuit for the motor of the furnace fan and a mercury switch incorporated in said circuit and supported upon the damper so as to be tilted thereby and a single pole double throw switch connected in circuit with the thermostatic switch means and the motor controlled thereby for varying the control which the thermostatic switch means exerts over its associated motor.

4. A control for heaters comprising a direct draft pipe and a stack pipe, a damper casing secured to and communicating with one of the said pipes and having an open end adjacent the other, said open end having tapered extensions, a single V-shaped damper having the intersection of its inclined sections pivotally supported at the extremities of the tapered extensions of the casing, whereby the damper in one position closes the opening in the casing and in its other position leaves said opening unobstructed, but closes the open end of the adjacent pipe, an electric motor connected to said damper for operating same and thermostatic switch controlled means for regulating the operation of said motor.

5. A control for heaters having means providing a direct draft and a check draft, a single damper controlling both the direct draft and the check draft, thermostatic switch control means for operating said damper, a regulator on said heater and responsive to the conditions of combustion therein, and motion transmission means between said regulator and said damper and acting to close the direct draft and open the check draft independently of the thermostatic switch controlled means when the temperature of the heating medium reaches the maximum point at which it can operate with safety and efficiency in the system with which the heater is associated.

6. A control system for use with the motor of a damper mechanism and with the motor of the furnace fan of a heater and comprising thermostatic switch controlled means regulating the operation of the damper mechanism motor, a switch regulating the operation of the furnace fan motor and connected with the damper mechanism to be actuated thereby, and a single pole double throw switch connected in circuit with the thermostatic switch means and the damper regulating mechanism motor controlled thereby for reversing the action which the thermostatic switch means exerts over its motor.

7. A control system for use with the motor of a damper mechanism and with the motor of the furnace fan of a heater and comprising thermostatic switch controlled means regulating the operation of the damper mechanism motor, a switch regulating the operation of the furnace fan motor and connected with the damper mechanism to be actuated thereby, and means for reversing the controlling action of the thermostatic switch on the damper regulating mechanism motor when the furnace fan is to be operated.

8. In combination, an air circulating system, a fan included in said system, a fan motor, an electric circuit including said motor a switch in said circuit, control means automatically actuated to open and close the switch upon changes in prevailing air conditions to which said control means is sensitive, and means to reverse the action of the control means.

9. In combination, an air circulating system, a fan included in said system, a fan motor, an electric circuit including said motor, air conditioning means arranged to act upon the circulating air and means for modifying the action of said air conditioning means when the circuit is closed, a switch in said circuit, control means automatically actuated to open and close the switch upon changes beyond a predetermined range in prevailing air conditions to which said control means is sensitive, and manually operable means to reverse the action of the control means.

10. In combination, an air circulating system, a fan included in said system, a fan motor, an electric circuit including said motor, a thermostatic switch in said circuit, control means comprising a thermostat automatically actuated to open and close said switch upon changes in prevailing air temperatures, and means to reverse the action of the control means.

11. In combination, an air circulating system, a fan included in said system, a fan motor, an electric circuit including said motor, a heater arranged to act upon the circulating air, and means for increasing the action of said heater when the circuit is closed, a thermostatic switch in said circuit, control means comprising a thermostat automatically actuated to open and close said switch upon changes in prevailing air temperatures beyond a predetermined range, and a manually operable master switch to reverse the action of the control means.

12. In combination, an air circulating system, a fan included in said system, a fan motor, a double contact switch, separate electric circuits each including one of said contacts and the motor, control means automatically actuated to close the circuit through one or the other of said contacts upon changes in prevailing air conditions to which said control means is sensitive, and a master switch arranged in one position to complete the circuit through one of the contacts and in another position to complete the circuit through the other of said contacts whereby to reverse the action of the control means upon the motor.

13. In combination, an air circulating system, a fan included in said system, a fan motor, a double contact switch, separate electric circuits each including one of said contacts and the motor, control means comprising a thermostat automatically actuated to close the circuit through one or the other of said contacts upon changes in prevailing air temperatures, and a master double throw switch arranged in one position to complete the circuit through one of the contacts and in another position to complete the circuit through the other of said contacts whereby to reverse the action of the control means upon the motor.

14. In combination, an air circulating system, a fan serving said system, a motor for said fan, switching means operative to make connection upon a decrease in temperature and to break connection upon an increase in temperature, an electric circuit operatively connecting said switch with said fan motor, switching means operative to make connection upon an increase in temperature and to break connection upon a decrease in temperature, an electric circuit operatively connecting said second named switching means with said fan motor, and means for breaking either of said electric circuits.

15. In combination, an air circulating system, a fan serving said system, a motor for said fan, switching means operative to make connection upon a decrease in temperature and to break connection upon an increase in temperature, an electric circuit operatively connecting said switch with said fan motor, means for heating the air in said system, means for increasing the action of said heater while said switch is closed, switching means operative to make connection upon an increase in temperature and to break connection upon a decrease in temperature, an electric circuit operatively connecting said second switching means with said fan motor, and means for breaking either of said electric circuits.

In witness whereof I hereto affix my signature.

GALEN D. BARKER.